United States Patent [19]
Milroy

[11] 3,951,377
[45] Apr. 20, 1976

[54] ROLLING-GATE, QUIET-THROTTLING, FLOW-CONTROL VALVE

[75] Inventor: Richard A. Milroy, Annapolis, Md.

[73] Assignee: The United States of America as represented by the Secretary of the Navy, Washington, D.C.

[22] Filed: Nov. 7, 1974

[21] Appl. No.: 521,983

[52] U.S. Cl............................ 251/35; 251/DIG. 2; 308/6 R; 137/501
[51] Int. Cl.² ......................................... G05D 7/00
[58] Field of Search ........... 137/501, 504, 497, 532, 137/533, 534, 535, 540; 308/6 R, 203, 209; 251/52, 281, 298, 337, DIG. 2, 46, 35

[56] References Cited
UNITED STATES PATENTS

| | | | |
|---|---|---|---|
| 2,349,368 | 5/1944 | Myers | 251/DIG. 2 |
| 2,699,316 | 1/1955 | Mosher | 251/35 |
| 2,784,740 | 3/1957 | Stageberg | 251/DIG. 2 |
| 3,049,146 | 8/1962 | Hayes | 251/DIG. 2 |
| 3,605,546 | 9/1971 | Klann | 251/DIG. 2 |
| 3,712,578 | 1/1973 | Dawson | 251/35 |
| 3,773,077 | 11/1973 | Barnebey | 251/DIG. 2 |
| 3,794,068 | 2/1974 | Milroy | 137/497 |

Primary Examiner—Martin P. Schwadron
Assistant Examiner—Robert J. Miller
Attorney, Agent, or Firm—R. S. Sciascia; Q. E. Hodges

[57] ABSTRACT

The invention is an automatic flow control valve. The rolling cluster of a rolamite is biased by the constant force due to the vertical component of gravity on the mass of the rolling cluster. The band of the rolling cluster progressively covers or exposes a porous passage which is integral with one of the rolling planes of the rollamite. Fluid flows through the porous passage and past the rollamite band.

The rolamite valve of this invention may be selectively modified to become, alternately, a remotely operated fluidic control valve, an automatic self-regulating volumetric flow control valve, an automatic self-regulating flow control valve for maintaining a constant output pressure, a vapor trap valve, and an automatic self-regulating flow control valve for maintaining a constant input pressure.

1 Claim, 6 Drawing Figures

ROLLING-GATE, QUIET-THROTTLING, FLOW-CONTROL VALVE

The invention described herein may be manufactured and used by or for the Government of the United States of America for governmental purposes without the payment of any royalties thereon or therefor.

BACKGROUND OF THE INVENTION

This invention uses the band of a Rolamite rolling cluster to act as a rolling gate to throttle fluid through a porous passage. The rolling cluster rollers are of sufficient mass so that the vertical component of the force due to gravity provides a constant force bias to the movement of the rolling cluster and therefore the rolling gate band.

The Rolamite is a simple machine which moves without sliding friction. The basic geometry consists of two rollers, a guideway made up of two parallel rolling planes restraining the rollers, the planes being spaced apart a distance less than the sum of the diameters of the rollers, and a resilient band supported under tension between the planes with a portion of the band wrapped partially around the first roller and looped in reverse fashion about the second roller. The portion of the band in contact with the rollers and the rollers themselves will hereinafter be referred to as the rolling cluster.

According to the prior art, rolling tape gates have been used to throttle flow through a high strength porous material. The tape is rolled out on the surface of the porous material and thereby determines the area of the material through which flow will be allowed. In the prior art, the rolling tape is mechanically held at a preselected position for the desired quantity of flow. For example, in U.S. Pat. No. 3,726,313 issued on Apr. 10, 1973 to Pandya, the Rolamite is used as a valve mechanism and the rolling cluster is mechanically restrained at selected positions to valve the fluid. In the aforementioned prior art devices the flow area of the porous passage remains constant irrespective of any change in the external demands on the valve and can be changed only upon physically rolling the tape and fixing it at another desired position.

U.S. Pat. No. 3,794,068 issued on Feb. 26, 1974 to the instant inventor, Richard A. Milroy, disclosed an automatic flow control valve which uses a negator spring to provide a constant force to resist the movement of a rolling cluster of a Rolamite. The result was an automatic volumetric flow control valve. A negator spring is a strip of flat spring stock which is stressed on one side to make it roll upon itself. The unique feature of the negator spring is that the spring force is constant all along its length. As disclosed in the aforementioned patent the valve maintains the flow rate at a constant level since any increase or decrease in the differential pressure across the negator-spring biased rolling cluster will cause a corresponding movement of the rolling cluster, which in turn results in a change in the flow cross-sectional area of the porous passage, until an equilibrium is again reached. Since the bias of the negator-spring is constant all along the length of motion of the rolling cluster, the equilibrium will exist only for the same volumetric flow rate irrespective of pressure changes in the system.

SUMMARY OF THE INVENTION

The primary purpose of this invention is to provide an improved quiet throttling valve for controlling fluid flow automatically to maintain selected flow conditions at constant levels. The differential pressure across the rolling cluster biased by the constant force of gravity causes the automatic flow adjustment in the respective alternative embodiments of the valve. The force on the rolling cluster due to the vertical component of the force of gravity is constant all along the length of movement of the rolling cluster. Therefore, any change in the differential pressure across the rolling cluster will cause a corresponding change in the position of the rolling cluster until the equilibrium is again reached. This equilibrium will exist when the change in position causes a return to the pre-existing pressure differential across the cluster. This will result in a return to the pre-existing flow condition that the valve has been made responsive to by the selection of one of the alternative structures disclosed.

OBJECTS OF THE INVENTION

It is an object of the invention to provide a simple and accurate automatic flow control valve.

It is another object of the invention to provide an automatic valve which controls the flow of a fluid to maintain a pre-selected flow condition at a constant level.

Other objects, advantages and novel features of the invention will become apparent from the following description of the invention when considered in conjunction with the accompanying drawings.

DESCRIPTION OF THE INVENTION

The basic gravity biased Rolamite valve of this invention can be adapted to provide a variety of specialized automatic flow control functions. Generally, the valve is normally biased shut by the constant force due to the vertical component of the force of gravity acting on the mass of the rollers. By bleeding fluid from the upper end of the Rolamite with a pilot valve, the Rolamite rollers act as a piston and are forced upward by the system pressure acting from below the rolling cluster rollers. Because there is no tight seal between the edge of the Rolamite rolling cluster and the side walls of the valve housing, a small pilot flow is required to take care of leakage around the rolling cluster to hold the rollers in one position. This pilot scheme operates the automatic flow dynamic response accurately when the valve is adapted as an automatic volumetric flow regulator, as a pilot-actuated valve, and as an automatic pressure regulator.

Theoretically the pilot actuating scheme as described above is unstable because the downward force is the same at every rolling cluster position and therefore the same pilot flow would, it would appear, hold the cluster at any of its positions. Actually, when the valve opens a differential amount the inlet pressure decreases minutely and the outlet pressure tends to increase. As a result the pilot flow decreases. Therefore, instability will only occur where the system's inlet and outlet approach infinite volumes so that their pressures will remain constant irrespective of the valve positions. In this unlikely circumstance the instability can be eliminated by placing a diverging groove in a side wall of the valve so that more pilot flow is required to hold the rolling cluster at a more open position.

Figure 1:
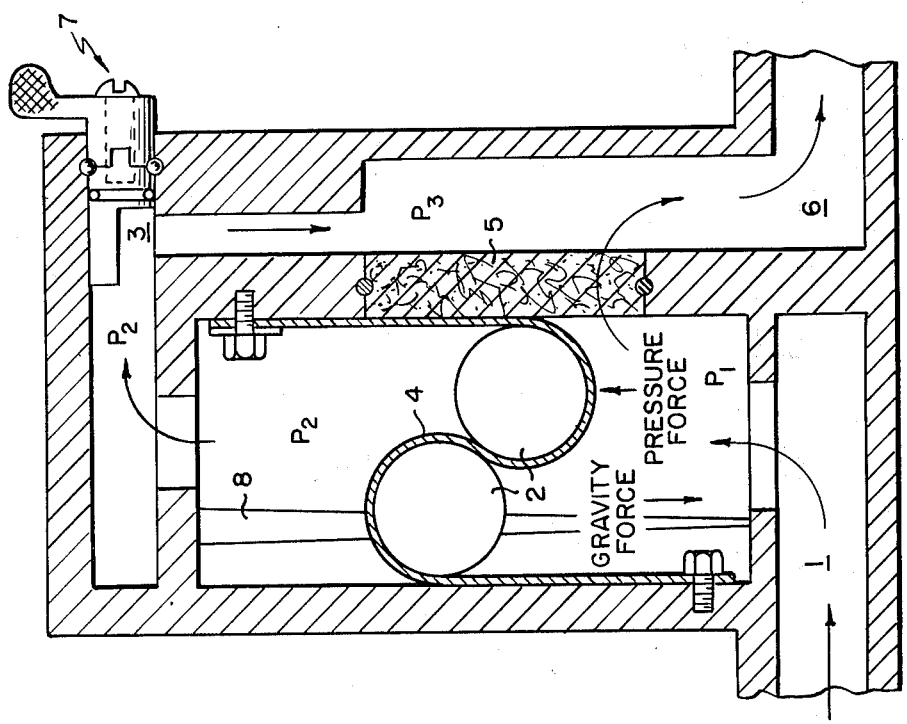
FIG. 1 is the valve of this invention adapted as a remotely controlled flow regulation valve.

In FIG. 1 the valve of this invention is shown as a remotely piloted valve. This embodiment acts as an ordinary valve to limit the maximum flow through a line. It does not provide automatic control but must be operated by changing the pilot flow regulating valve. Fluid flows into the valve through the inlet passage 1 at a pressure P1 and pushes up on the rolling cluster made up of rollers 2 and band 4. The fluid flows through porous passage 5 into the exit passage 6. The force of gravity acts on the mass of rollers 2 to generate a constant downward bias on the rolling cluster. This valve is normally biased to the closed position in which the band 4 substantially completely cover the porous passage 5 when the rollers 2 are in the lowermost position. There is some leakage around the sides of the rolling cluster. This leakage is the pilot flow. The rollamite valve is opened by opening pilot valve 7 and bleeding fluid from the upper chamber which is at a pressure P2 through pilot valve 7 into the exit or outlet passage 6. The valve in this figure includes optional diverging groove 8 which requires more pilot flow to maintain the valve at a more open position. This increases stability and accuracy of the position of the rolling cluster relative to a given adjustment of the pilot flow.

The valve of FIG. 1 has a maximum opening of porous plug 5 for any given pilot flow setting. The pilot flow is set by the opening of pilot valve 7. The differential pressure across the rolling cluster is determined by the opening of pilot valve 7; as long as the output pressure remains relatively constant flow through the valve remains constant. If there is an element in the flow system downstream of this valve which will make the output pressure vary, the pilot flow can be bled to a sump rather than to outlet passage 6. If the varying pressure is upstream the pilot flow will not be affected and the valve will operate as discussed.

Figure 2:
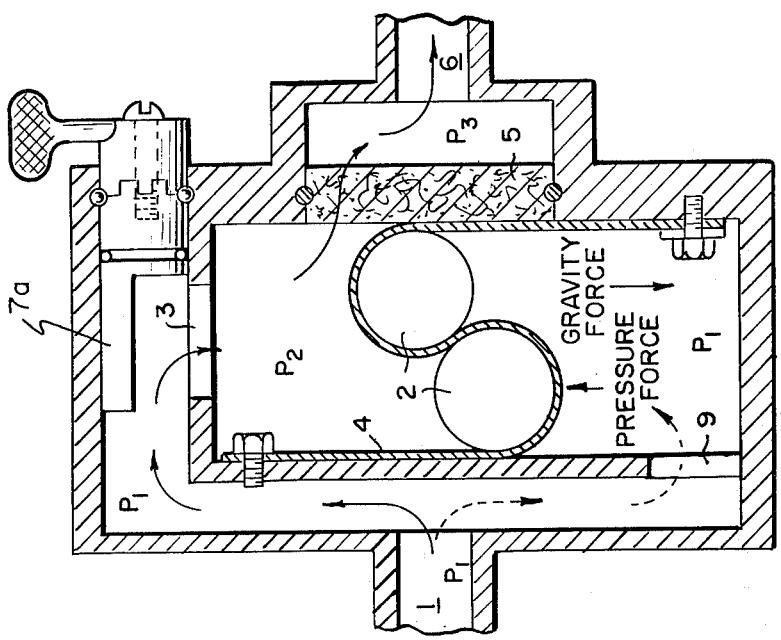
FIG. 2 is the valve of this invention adapted as an automatic volumetric flow control valve.

FIG. 2 is an automatic flow control valve for automatically maintaining a predetermined volumetric flow rate set by adjusting flow restriction 3. The flow through the adjustable restriction 3 is controlled by pilot valve gate 7a and the restriction 3 causes the intermediate pressure P2 to be less than the inlet pressure P1. This differential pressure across the rollers 2 acts to overcome the force of gravity and lifts the rollers 2. The Rolamite band 4 forms a rolling gate over the porous part 5. Movement of the band over the porous passage causes changes in the flow and differential pressure across the rolling cluster made up of the rollers 2 and the band 4. At a given opening the force of gravity is balanced by the upward force of the differential pressure. Since the force of gravity all along the length of movement of the rollers is constant and the differential pressure across the rollers is determined by the flow rate, the flow remains constant irrespective of any changes in the inlet pressure P1 or the outlet pressure P3. In the valve configuration shown, flow enters the valve through the inlet flow passage 1 at a pressure P1. The inlet flow passes through pilot valve restriction 3 into a first valve chamber and out through the porous passage 5 into exit chamber 6. The inlet pressure is transmitted from inlet passage 1 through orifice 9 into the second valve chamber still at pressure P1. This produces a pressure differential across the rollers 2 which balances the force of gravity on the rollers. The desired flow rate to be automatically maintained is initially obtained by setting the adjustable restriction 3 at a position where the desired volumetric flow rate of the valve is reached. Increasing the resistance to flow of restriction 3 by reducing its area will cause the rollers 2 to lift and cover the porous material 5. A smaller flow rate will result. The dynamic response of the valve is determined by the size of orifice 9 which is the pressure sensing part.

Figure 3:
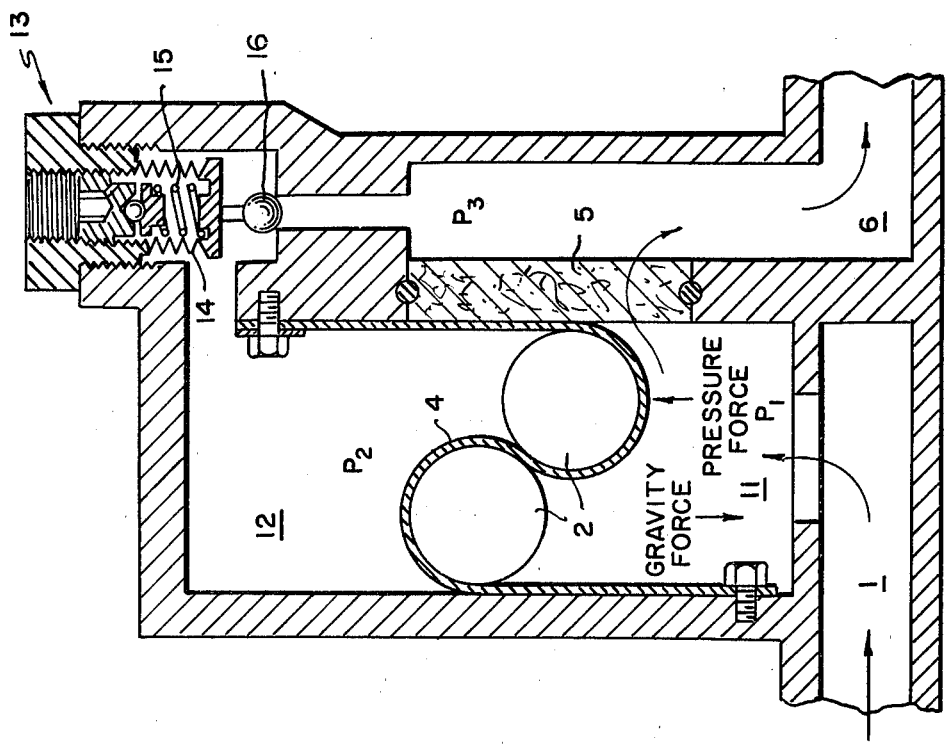
FIG. 3 is the valve of this invention adapted as an automatic constant outlet pressure regulating valve.

FIG. 3 is the gravity biased valve of this invention adapted as an automatic constant outlet pressure regulating valve. As shown in that Figure flow enters the valve from inlet passage 1 through the inlet orifice 10 into the first chamber 11, at a pressure P1, which is below the rolling cluster. Some of the fluid flows past the side of the rolling cluster to enter the second chamber 12 above the rolling cluster which is at a pressure P2. The remaining fluid flows through porous passage 5 into outlet chamber 6 which is at a pressure P3.

In this embodiment flow is intermittently restricted from chamber 12 into the outlet passage 6 by way of pilot valve 13. Pilot valve 13 is a spring biased poppet valve. When the outlet pressure, P3, increases sufficiently above the pressure in the second chamber, P2, the force on the bellows 14 is sufficient to overcome the force of spring 15 to cause poppet 16 to engage the valve housing to stop the pilot flow and thus maintain the outlet pressure, P3, at the level predetermined by the selection of the spring force applied by spring 15. The outlet pressure is maintained since once the pilot flow is stopped the rollers will drop and tend to close off the porous passage 5 until the preset outlet pressure is reached.

Figure 4:
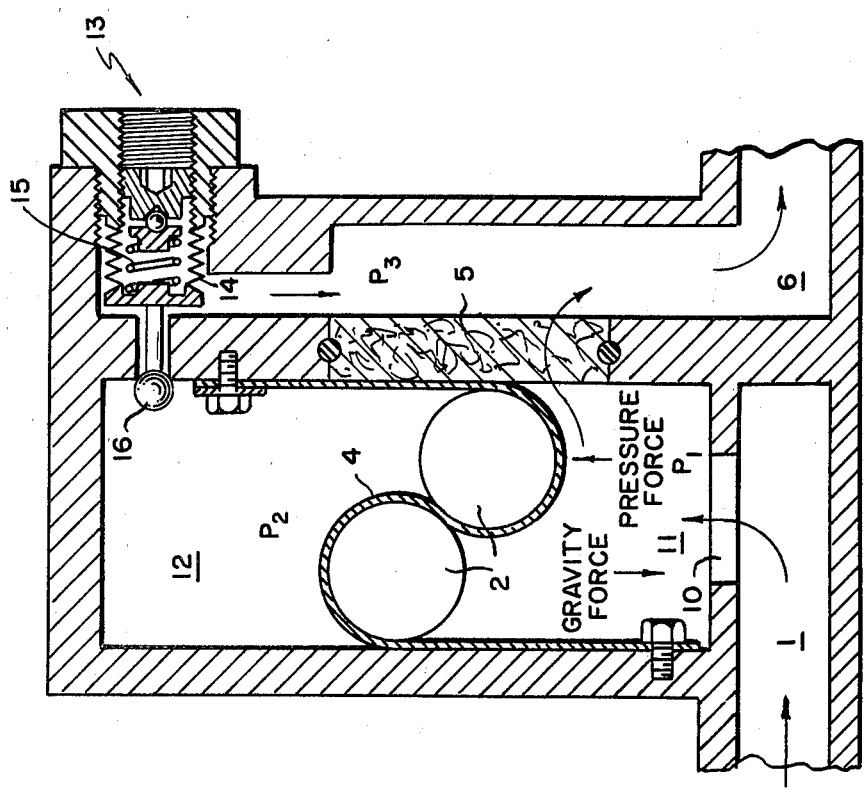
FIG. 4 is the valve of this invention adapted as an automatic inlet pressure regulating valve to automatically maintain the inlet pressure at a preselected level.

FIG. 4 is the gravity biased valve of this invention adapted as an automatic inlet pressure regulating valve which maintains the inlet pressure at a preselected level. The flow through this embodiment of the valve of this invention is substantially similar to that of the previous embodiment shown in FIG. 3. However, the operation of the pilot valve 13 is different and this difference results in the regulation of the inlet flow at a constant pressure as opposed to the regulation of the outlet pressure as in the embodiment shown in FIG. 3. Here the pilot valve 13 is biased closed by the force of spring 15. When the control pressure, P2, becomes great enough to overcome the spring force of spring 15 the bellows 14 will be compressed and lift the pilot valve poppet 16 to permit pilot flow past the rollers 2. The pilot flow passing the rollers will cause a differential pressure, $\Delta P_{1\text{-}2}$, which will lift the rollers to uncover the porous passage 5. Fluid will then flow from the inlet passage 1 through the porous passage 5 and the inlet pressure, P1, will be maintained at the preselected pressure. The inlet pressure which is sought to be maintained is selected by setting the tension on pilot spring 15.

Figure 5:
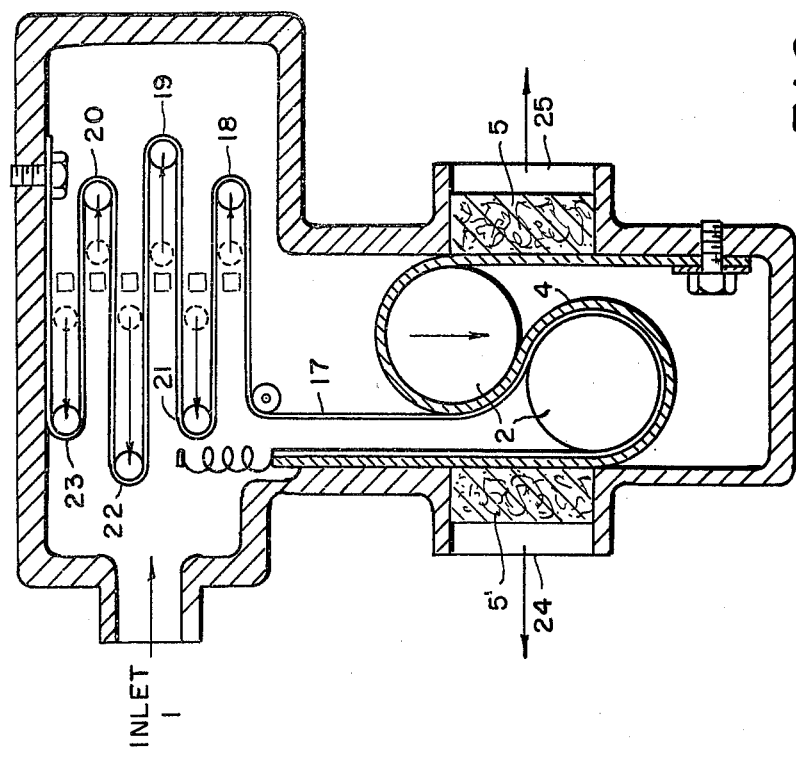
FIG. 5 is a gravity biased Rolamite valve with an output flow proportional to the sum of six simultaneous input signals that are automatically mechanically integrated.

As shown in FIG. 5 the gravity biased Rolamite valve of this invention may be adapted to become a three-way feedback integrating valve. Mechanical "walking beam" and electrical integrators are most often used to provide integrated feedback. The Rolamite valve of this invention can be used to provide an output flow which is proportional to the sum of many simultaneous input signals that are automatically integrated. As shown in FIG. 5 the weight of the rollers 2 provides a constant bias against tape or wire 17. The position of tape or wire 17 is determined by the displacement of pulleys 18 through 23, each of which is moved by one of the input signals to be integrated. Flow enters the valve through inlet passage 1 and flows through the left outlet 24 which is biased to closed or through right outlet 25 which is biased to open or alternatively through neither if both 24 and 25 are closed (as shown).

Figure 6:
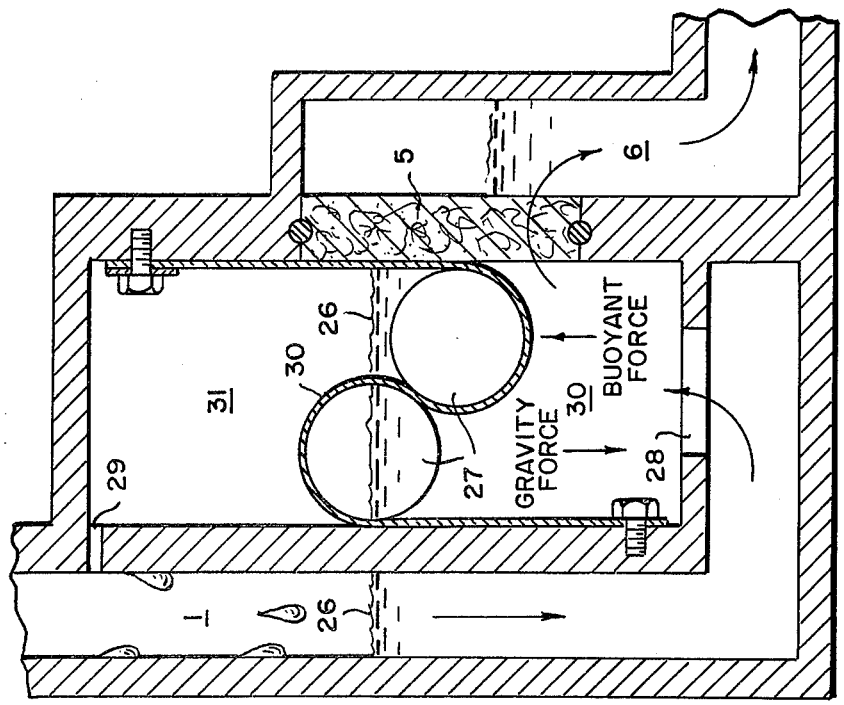
FIG. 6 is the gravity biased Rolamite valve of this invention adapted as a vapor trap valve for separating liquid from a pressurized gas.

FIG. 6 is the gravity biased Rolamite valve of this invention adapted as a vapor trap valve for separating liquid from a pressurized gas. As shown in the Figure, condensate entering inlet passage 1 builds up the liquid level 26 in the inlet passage 1 and the valve chambers 30 and 31. The rollers 27 are bouyant in the liquid phase of the fluid, thus, the rollers are forced upward with the increase in the liquid level 26 causing the rolling gate band 30 to expose a portion of the porous passage 5 to allow the condensate to flow through the valve by way of outlet passage 6. As the condensate level is lowered, the bouyant rollers 27 will drop the rolling gate band 30 and close the porous passage 5 to keep the pressurized gas from escaping. The bouyant force is proportional to the volume of liquid displaced by the rollers 27 and is independent of the weight of the rollers.

The valves as shown in the drawings are oriented such that the path of movement of the rolling cluster is vertical. Any valve constructed as taught by this invention may be oriented off of the vertical at any angle as long as there is a bias of the rolling cluster by the vertical component of gravitational force.

Obviously many modifications and variations of the invention are possible in the light of the above teachings. It is therefore to be understood that within the scope of the appended claims the invention may be practiced otherwise than as specifically described.

What is claimed is:

1. A flow control valve, comprising:

a valve housing;

an inlet and an outlet in said housing;

a first and second fluid chamber within said housing;

a first rolling plane within said housing;

a second rolling plane within said housing;

a porous passage integral with said second rolling plane and communicating with said outlet, said passage being in communication with said inlet through one of said chambers;

a rolling cluster comprising a band and a first and second roller, said rolling cluster being free to translate between and along said first and second rolling planes to variably divide said housing into said first and said second chambers; said rolling cluster being free to move along said second plane to progressively cover or expose said porous passage depending upon the direction of its motion, and said rollers being selected to be of sufficient mass to be constantly biased in one direction of motion by the constant vertical component of the force of gravity on said cluster, and said housing containing a rolling cluster by-pass channel which increases in cross-sectional area from one end of said housing to the other such that the by-pass flow area changes according to the position of said rolling cluster.

* * * * *